United States Patent
Crossley et al.

(10) Patent No.: US 10,938,927 B2
(45) Date of Patent: Mar. 2, 2021

(54) MACHINE LEARNING TECHNIQUES FOR PROCESSING TAG-BASED REPRESENTATIONS OF SEQUENTIAL INTERACTION EVENTS

(71) Applicant: ORACLE INTERNATIONAL CORPORATION, Redwood City, CA (US)

(72) Inventors: Peter Crossley, Portland, OR (US); Ethan Dereszynski, Oregon City, OR (US)

(73) Assignee: Oracle International Corporation, Redwood Shores, CA (US)

( * ) Notice: Subject to any disclaimer, the term of this patent is extended or adjusted under 35 U.S.C. 154(b) by 802 days.

(21) Appl. No.: 15/691,410

(22) Filed: Aug. 30, 2017

(65) Prior Publication Data

US 2018/0063265 A1    Mar. 1, 2018

Related U.S. Application Data

(60) Provisional application No. 62/381,719, filed on Aug. 31, 2016.

(51) Int. Cl.
*H04L 29/08*        (2006.01)
*G06N 7/00*         (2006.01)
(Continued)

(52) U.S. Cl.
CPC .............. *H04L 67/22* (2013.01); *G06N 5/02* (2013.01); *G06N 7/005* (2013.01); *G06N 20/00* (2019.01);
(Continued)

(58) Field of Classification Search
CPC ....... H04L 67/22; H04L 67/306; G06N 20/20; G06N 20/00; G06N 7/005
See application file for complete search history.

(56) References Cited

U.S. PATENT DOCUMENTS 8,495,502 B2 *   7/2013   Boyle ................... H04L 67/306
                                                          715/751
2014/0033074 A1 *  1/2014   Thibaux ................ G06Q 50/01
                                                          715/753
(Continued)

OTHER PUBLICATIONS

Vasanthan Raghavan, Greg Ver Steeg, Aram Galstyan, and Alexander G. Tartakovsky, "Modeling Temporal Activity Patterns in Dynamic Social Networks", Mar. 2014, IEEE Transactions on Computational Social Systems, vol. 1, No. 1, pp. 89-107. (Year: 2014).*

(Continued)

*Primary Examiner* — Kamran Afshar
*Assistant Examiner* — Ying Yu Chen
(74) *Attorney, Agent, or Firm* — Kilpatrick Townsend & Stockton LLP

(57) ABSTRACT

Methods and systems are provided for processing tag-based event communications using machine learning. One or more event communications are received from a user device. The communication(s) include key-value pairs representing an ordered sequence of multiple interaction events of a set of predefined events. Each communication of the one or more event communications includes one generated via execution of tag code integrated with code of an app page or of a webpage. A representation of the ordered sequence is processed using a machine learning model to generate one or more profile estimation results that include an identification of a particular user profile from amongst a set of stored user profile. Profile data is transmitted to a client system that identifies the particular user profile or is from the particular user profile.

17 Claims, 11 Drawing Sheets

(51) Int. Cl.
*G06N 20/00* (2019.01)
*G06N 20/20* (2019.01)
*G06N 5/02* (2006.01)
*G06N 5/00* (2006.01)
*G06N 3/02* (2006.01)
*G06N 20/10* (2019.01)

(52) U.S. Cl.
CPC ........... *G06N 20/20* (2019.01); *H04L 67/306* (2013.01); *G06N 3/02* (2013.01); *G06N 5/003* (2013.01); *G06N 20/10* (2019.01); *H04L 67/02* (2013.01)

(56) References Cited

U.S. PATENT DOCUMENTS

| | | | | |
|---|---|---|---|---|
| 2016/0092914 | A1* | 3/2016 | Wiener | G06Q 30/0246 |
| | | | | 705/14.45 |
| 2016/0274744 | A1* | 9/2016 | Neumann | H04N 21/47202 |
| 2017/0140041 | A1* | 5/2017 | Dotan-Cohen | G06Q 10/101 |
| 2017/0250882 | A1* | 8/2017 | Kellicker | H04L 67/16 |
| 2017/0353477 | A1* | 12/2017 | Faigon | G06N 7/005 |

OTHER PUBLICATIONS

Zhen-Yu Chen, Zhi-Ping Fan, and Minghe Sun, "Behavior-aware user response modeling in social media: Learning from diverse heterogeneous data", Available online Sep. 23, 2014, European Journal of Operational Research vol. 241, Issue 2, Mar. 1, 2015, pp. 422-434. (Year: 2014).*

* cited by examiner

MACHINE LEARNING TECHNIQUES FOR PROCESSING TAG-BASED REPRESENTATIONS OF SEQUENTIAL INTERACTION EVENTS

CROSS-REFERENCE TO RELATED APPLICATIONS

This application claims the benefit of and the priority to U.S. Provisional Application No. 62/381,719, filed on Aug. 31, 2016, which is hereby incorporated by reference in its entirety for all purposes.

BACKGROUND

Due in part to the proliferation of webpages and app pages, the number of user inputs that can be tracked has exponentially increased. However, frequently, data available for processing corresponds to an individual session and thus fails to include potentially useful data from one or more prior sessions. Some techniques, such as login capabilities, support retrieval of user-specific data from one or more prior sessions. Nevertheless, many pages do not require login (e.g., due to perceived or actual user inconvenience). Thus, processing may often be restricted to independent-session processing, thereby limiting the depth of detail by which users may be characterized (e.g., for the purposes of page customizations or tracking).

SUMMARY

In some embodiments, unique tag code is distributed from a tag processing system to each client of a set of clients. The tag code can be configured to be integrated with code for a webpage or app page. For example, the tag code may be configured to be added to code for the webpage or app page, such that it is executed at a user device that is rendering the webpage or app page. Execution of the tag code at a user device can result in an identification of set of predefined events for which monitoring is to be performed. For example, the tag code itself may identify part or all of the set of predefined events, and/or the tag code may include a destination address and instructions to transmit a request, to the destination address, for identification of some or all of the set of predefined events. In some instances, the tag processing system further supports an interface via which a user can modify the set of predefined events (e.g., by adding one or more events). Execution of the tag code can further result in processing received input data to determine whether the input data corresponds to any of the set of predefined events. If so, execution of the tag code can cause a communication to be transmitted from the user device to the tag processing system that includes a set of key-value pairs corresponding to the session (e.g., identifying a device type, geocountry, browser, webpage URL and/or app page identifier). The set of key-value pairs can include one or more default pairs and/or one or more pairs identified by a client. The set of key-value pairs may be identified (for example) in the tag code or by requesting the set of pairs from a destination address identified in the tag code. At least one of the key-value pairs can represent the detected event. In various instances, a single communication may represent a single detected event of the set of predefined events or multiple detected events of the set of predefined events (e.g., in an ordered or unordered manner).

The tag processing system can process one or more received communications using a machine learning model to identify profile data that identifies a particular user profile. The machine-learning model can, in some instances, include an ensemble model that incorporates multiple sub-models. In some instances, different types of models may be used to process values associated with different (known or estimated) types of data. For example, different types of models may be used depending on one or more values (e.g., from a single communication or derived from multiple communications) are associated with discrete and constrained data (e.g., categorical data), continuous data (e.g., numeric data), unstructured data (e.g., text data) or sequential data (e.g., time-series data). Each model may produce a result including one or more first profile estimation results that may (for example) identify a particular user profile estimated to correspond to the communication(s) and/or identify, for each of one or more profiles, a probability that the communication(s) correspond to the profile. When multiple results are generated, the results may be collectively processed (e.g., using an ensemble machine learning model) to identify one or more second profile estimation results (e.g., that identify a particular user profile estimated to correspond to the communication(s) and/or identify, for each of one or more profiles, a probability that the communication(s) correspond to the profile).

A communication can be transmitted to the client device based on the first profile estimation results and/or the second profile estimation results. The communication may (for example) identify a particular profile, include at least part of the particular profile, and/or include a confidence metric). In some instances, the communication is conditionally transmitted (e.g., only when a confidence metric exceeds a predefined threshold).

In some instances, the tag is configured to trigger transmission of one or more communications that represents an ordered sequence of multiple interaction events associated with an app page or webpage of the client. For example, a set of communications may be received from a user device at various times. Each communication may represent (e.g., via a key-value pair) an interaction event (e.g., of a particular type and/or occurring at a particular event time). The tag processing system can thus generate the ordered sequence of multiple interaction events to include those interaction events represented in the set of communications and in an order determined based on times at which the set of communications were received or times identified in the communications. It will be appreciated that, in some instances, the ordered sequence of multiple interaction events may be updated when a new communication is received from the user device (e.g., to append data representing a new event to the ordered sequence).

Each event in the sequence may be indicative of (for example) one or more of an interaction type (e.g., landing on page, leaving page, clicking, scrolling, starting a video, stopping a video, pausing a video, providing an input of a given type, entering a search query, viewing a content object, etc.), a page at which the interaction was detected (e.g., a particular webpage or a particular app page), and/or a content object to which the event pertains (e.g., a particular image, a particular video, a product corresponding to a particular image, etc.). In some instances, an event may further include (for example) data characterizing the page and/or content object.

The ordered sequence of multiple interaction events can be processed as sequential data using a machine learning algorithm (e.g., a Hidden Markov machine-learning model, a sliding window machine-learning model, a Maximum Entropy machine-learning model, an Input-Output Hidden Markov Model machine-learning model, a Conditional Random Fields machine-learning model, a Graph Transformer Network machine-learning model, a model using Kullback-Leibler divergence metrics to process sequential data, or a model using a Kalman filter to process sequential data). The machine-learning algorithm may be configured to compare part or all of the ordered sequence to part or all of an event sequence identified in each of a set of stored user profiles. Each of the set of stored user profiles may be associated with a particular user (e.g., human user) or type of user. As a result of the comparison, one or more results may be generated that identify a particular user profile estimated as corresponding to the ordered sequence and/or identify a probability that each of one or more particular profiles correspond to the ordered sequence (e.g., a 10% probability for a first profile, 5% probability for a second profile, 3% probability for a third profile, etc.). The result may include a confidence metric (e.g., a normalized metric) associated with the result. In some instances, the result is used along with other data (e.g., one or more results from execution of another machine-learning model) to identify a user profile and/or confidence metric.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Illustrative embodiments of the present invention are described in detail below with reference to the following drawing figures.

DESCRIPTION

Some embodiments of the invention provide an approach to automatically construct a log categorizer. Instead of requiring a person to manually assess the contents of the log parser, the log contents themselves are used to construct the categorizer. Other additional objects, features, and advantages of the invention are described in the detailed description, figures, and claims.

Figure 1:
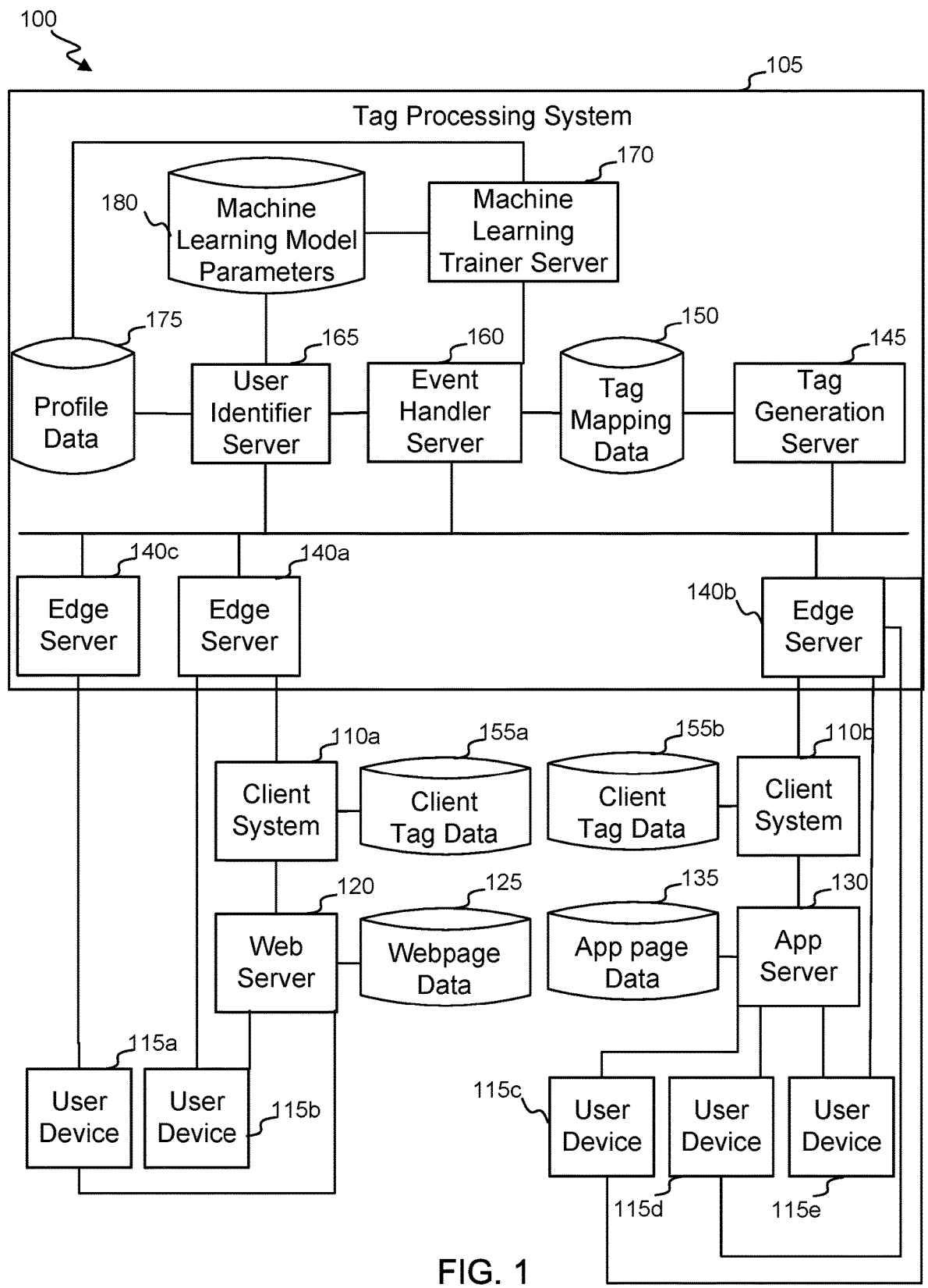
FIG. 1 illustrates an interaction system for using tag codes and machine learning to track and process user interaction events.

FIG. 1 illustrates an interaction system 100 for using tag codes and machine learning to track and process user interaction events. In interaction system 100, a tag processing system 105 can communicate with one or more client systems 110a, 110b and one or more user devices 115a, 115b, 115c, 115d and/or 115e via one or more networks (e.g., the Internet, a wide area network, local area network or other backbone). Tag processing system 105 and/or a client system 110a, 110b may include a single device (e.g., single server or single computer) or collection of devices (e.g., multiple servers or multiple computers) and/or may—but need not—include one or more cloud servers. User device 115a, 115b, 115c, 115d and/or 115e may include (for example) a computer, a tablet, a smart phone, a smart wearable device, an IoT device, and/or smart home device.

Client system 110a is associated with a client that hosts one or more web sites, each associated with a domain and each including one or more webpages. Client system 110a provides hosting instructions, identifies content and at least partly defines webpage code to web server 120, which processes requests from a user device 115 for webpages (e.g., HTTP or HTTPS requests) by returning webpage code (e.g., HTML code). Web server 120 stores web page code for each page in the client's domain in a webpage data store 125.

Client system 110b is associated with a client that hosts one or more apps, each including one or more app pages. Client system 110a provides hosting instructions, identifies content and at least partly defines app-page code to app server 130, which processes requests from a user device 115 for app pages by returning app code. App server 130 stores app page code for each page in the client's app in an app page data store 135.

Tracking user interaction events with a webpage or app page can facilitate identifying or characterizing the user, customizing content on the webpage or app page, or initiating a subsequent user-specific or general action. Towards this end, tag processing system 105 can generate tag code to be integrated with code for a webpage or app page. The code can be configured to cause user devices 115 to transmit event communications to tag processing system 105 in response to detecting an event of a set of predefined events.

More specifically, tag processing system 105 can receive, from each of client systems 110a, 110b, a request for tag code. The requests may be received by edge servers 140a, 140b in communication with client systems 110a, 110b (e.g., as a result of a communication-routing protocol employed by tag processing system 105). Edge servers 140a, 140b may avail the request to a tag generation server 145, which can then generate, for each of client systems 110a, 110b, tag code. The tag code can include, for example, Javascript code, Software Development Kit (SDK) code, code for a wearable device, or any other code configured to collect and report data during presentation of a webpage or app page. To allow for dynamic updates, the tag code may be configured to, when executed, retrieve one or more parameters, definitions and/or configurations from a defined virtual location.

The tag code can be configured to, upon execution, identify a set of predefined events for which to monitor. The tag code can further be configured to, upon execution, identify one or more specifications for a payload for the event communications. The one or more specifications can indicate client-specific data (e.g., an alphanumeric identifier that is unique to the client from amongst other clients) that is to be included or otherwise represented by the payload. In some instances, the tag code generated by tag generation server 145 includes the client-specific data or includes an indication as to how the client-specific data is to be generated. Tag generation server 145 can generate the client-specific data using, for example, a pseudo-random generator (e.g., of numeric, alphabet and/or symbol characters). Tag generation server 145 can store tag mapping data for each client in a tag mapping data store 150. The tag mapping data can include data that facilitates identifying a client system associated with an event communication. For example, tag mapping data may include an association between static client-specific data and an identifier of a client.

The one or more specifications can further or alternatively identify a set of key-value pairs to be included in each event communication. For example, specific characters may be identified for the key along with instructions and/or a location indicating how to determine an associated value. The one or more specifications may also identify a structure for the event communication, such as an order in which the set of key-value pairs are to be. In some instances, the tag code itself includes the one or more specifications.

Tag generation server 145 can transmit (e.g., via an edge server 140a, 140b) the generated tag code to client systems 110a, 110b. The tag code sent to each of client systems 110a, 110b may be different. For example, the tag code may include different client-specific data. In some instances, the tag code sent to each of client systems 110a, 110b is the same but specifies an action via which a client system can retrieve or generate unique client-specific data.

Upon receiving the tag code, client system 110a and/or 110b may provide one or more inputs to modify the tag code. For example, the tag code may be directly modified or an interface may be provided that indicates current configurations of the tag code (e.g., identifying the set of predefined events, the client-specific data, the set of key-value pairs, and/or the structure for the event communication). Modification of one or more current configurations may, but need not, cause a notification of the modification to be transmitted to tag generation server 145, which may update tag mapping data store 150 to reflect the modification. In some instances, each of the set of predefined events is associated with a key-value pair of the set of key-value pairs (e.g., which indicates whether the particular type of event has occurred), and modifying the set of predefined events (e.g., to add or remove a predefined event) may automatically change the set of key-value pairs (e.g., to add or remove a key-value pair).

Client systems 110a, 110b can store the tag data in respective local or remote client tag data stores 155a, 155b. Modifying the tag data may cause the stored tag data to be updated. By storing the tag data, client system 110a and/or 110b can periodically access the tag data to, for example, modify configurations and/or newly integrate the tag data with one or more app pages or webpages.

Client system 110a can integrate its received (or modified) tag code with webpage code for one or more hosted webpages, and client system 110b can integrate its received (or modified) tag code with app page code for one or more hosted app pages. While not shown in FIG. 1, it will be appreciated that, in some instances, same or similar tag code (e.g., mapped to a same client) may be configured to be integrated with both app pages and webpages, so as to facilitate identifying users across platforms. Integrating the tag code may include, for example, add the tag code to the app-page or webpage code. Thus, integrating the tag code may include updating webpage data stored at webpage data store 125 or app-page data stored at app page data store 135.

Subsequently, when a user device 115a or 115b requests a webpage from web server 120, web server 120 can return the webpage code integrated with the tag code. Similarly, when user device 115c, 115d or 115e requests an app page from app server 130, app server 130 can return the app page code integrated with the tag code. When the requesting user device then executes the webpage code or app page code (e.g., using a browser or app), the integrated tag code is also executed. Thus, an app or browser can begin monitoring for the particular predefined events (e.g., based on an analysis of input received at the user device) and can, upon detecting such an event, can transmit an event communication (e.g., immediately or in accordance with a defined timing protocol) that includes a payload generated in accordance with one or more predefined specifications to tag processing system. It will be appreciated that, in some instances, a value for each of one or more key-value pairs may be unknown at a time that the event communication is being generated. In these instances, the value may be set to a null value or the key-value pair may be omitted from the payload of the event communication. It will further be configured that particular types of integration may result in different tag codes being executed (e.g., if multiple tag codes are generated for a client) when different parts of a page, web site or app are being used. The different tag codes may differ with respect to the types of events in the predefined set of events and/or types of key-value pairs in the set of key-value pairs. The client-specific data may be the same or different.

An event communication can be received by an edge server 140a, 140b or 140c of tag processing system 105. The receiving edge server 140 can route the event communication to an event handler server 160. Event handler server 160 can identify a client system to which the event communication corresponds (e.g., by querying tag mapping data store 150 with client-specific data). Any known information regarding types of data in value fields, structure of the event communication, can further be retrieved.

Event handler server 160 can avail the event communication with associated information (e.g., client identifier, types of data, etc.) to a user identifier server 165 and/or machine learning trainer server 170. Generally, user identifier server 165 can attempt to match data from the event communication to data from a particular user profile stored at a profile data store 175. In some instances, each profile represents a particular human user. In some instances, each profile represents a type of user. It will be appreciated that, in some instances, a match with an existing profile is not identified, such that a null profile or null result can be returned.

Identifying profiles for particular app or web-site sessions is particularly useful presently, given that individual users often use multiple devices to access a web site or app. For example, each of user devices 115a and 115b may be associated with a same user, and each of user devices 115c, 115d and 115e may be associated with a same user.

User identifier server 165 can identify a profile match by, for example, processing values from key-value pairs in the event communication using one or more machine learning models. Each machine learning model of the one or more machine learning models may have been generated at least in part by executing a machine learning process that trains the machine learning model. The training can use a set of different detected instances of ordered sequences of same and/or different interaction events. For example, one set can include (in order) Events A, B, C and D, another set can include Events A, B, D and C, and a third set can include Events D, E, A and F. Each instance of the set of different detected instances may be associated with an identifier of a profile (which may correspond to or include an identifier of a source). Thus, a training can include a supervised training and/or can include adjusting one or more model parameters based on the set of different detected instances and profile identifiers. The adjustment(s) can be configured such that a conditional probability of identifying a profile associated with an instance in response to receiving the instance is strengthened or increased (e.g., by increasing a weight, adding an edge, adding an intermediate node, etc.). In some instances, the training includes modifying one or more parameters based on a cost function that compares an initial profile result generated by the model(s) with an actual result associated with the identified profile.

In some instances, training includes unsupervised or semi-supervised training. For example, a clustering technique may identify that certain data points are frequently coinciding within a single event communication or set of event communications. A cluster may be initially be generated that associates (for example) a sequence of interaction events with a particular IP address. Subsequently, if the sequence of interaction events is detected with a different (e.g., novel) IP address, the model may be used to indicate that the sequence is consistent with the cluster.

User identifier server 165 may use different types of models to process values associated with different types of data. For example, a set of values associated with discrete and constrained (e.g., categorical) data types may be processed by a first machine learning model (e.g., a decision tree model or logistic regression model); one or more values associated with continuous-value data types may be processed by a second machine learning model (e.g., a linear regression model, Kernel method model, or artificial neural network), one or more values associated with unstructured data types (e.g., text) may be processed by a third machine learning model (e.g., a topic modeling model or Latent Dirichlet Allocation); and/or one or more values associated with sequential values may be processed by a fourth machine learning model (e.g., a Hidden Markov machine-learning model, a sliding window machine-learning model, a Maximum Entropy machine-learning model, an Input-Output Hidden Markov Model machine-learning model, a Conditional Random Fields machine-learning model, a Graph Transformer Network machine-learning model, a model using Kullback-Leibler divergence metrics to process sequential data, or a model using a Kalman filter to process sequential data).

It will be appreciated that, in some instances, the data input to a machine learning model is derived based on payloads from multiple event communications associated with a given session and/or user device. For example, each of a set of event communications may represent a detection of a distinct event (e.g., distinct interaction event) and may be associated with a particular time. Thus, sequential data may be generated that identifies an ordered sequence of detected events. The sequential data need not be of a defined length, as a number of detected events may vary across sessions. Alternatively, the sequential data can be set to include null values for each remaining data element where a corresponding event has not been detected.

Execution of each machine learning model may produce a first profile estimation result that includes (for example) a particular user profile estimated to correspond to the event communication, a confidence of an estimation, or a set of probabilities indicating the likelihood that the event communication corresponds to each of a set of profiles. User identifier server 165 can then process the first profile estimation results generated by multiple models to produce a second profile estimation result (e.g., that includes a particular user profile estimated to correspond to the event communication, a confidence of an estimation, or a set of probabilities indicating the likelihood that the event communication corresponds to each of a set of profiles). The first profile estimation results can be processed, for example, using stored weighting or an ensemble machine learning model. The ensemble machine learning model may be configured to weight results from various underlying models based on prediction accuracy and/or the type of model being used. While a machine learning model may include an ensemble model that uses multiple types of underlying machine learning models, it will be appreciated that a machine learning model may instead selectively be a single type of machine learning model (e.g., to selectively process compatible values or to unselectively process all values despite a potential distinction between data types).

User identifier server 165 can process the result to determine whether to transmit a communication with profile information to a client system 110. The result processing can include, for example, determining whether a confidence metric exceeds a predefined reporting threshold or whether a presently identified profile is different than one previously identified (e.g., in association with a user device), in which case, it may be determined that a communication is to be transmitted. The communication may include an identification of a particular profile, part of the particular profile, one or more values from the event communication (e.g., an IP address of the user device or a session identifier). A client system 110 may use the profile information to, for example, customize a present or future app page or webpage, send customized emails, present customized offers (e.g., based on past purchases, a location, a quantity or frequency of past visits to a web site or app, or interaction with different content objects), etc.

User identifier server 165 may further determine whether to update a user profile. A user profile may include data collected based on one or more previous sessions or interactions with the user. For example, it may identify when and/or a number of times that the user visited a web site or app, previously entered search terms, a purchase history, interactions with particular or particular types of content objects, and/or field values entered by the user (e.g., name, address, email, age, etc.). In some instances, it is determined to update the user profile when a confidence metric exceeds a predefined updating threshold. Updating a profile may include, for example, stitching information from the event communication to other information in the profile, updating data values in the profile based on the event communication (e.g., to reflect an additional visit), or adding new key-value pairs to the profile. The profile updating may be performed at user identifier server 165 or at an edge server 140. In some instances, part or all of profile data store 175 is accessible (e.g., for read and write operations or for read-only operations) to a client system 110.

Machine learning trainer server 170 can use event communications and/or profile estimation results to update machine learning model parameters (e.g., weights, hidden variables, etc.) stored in a machine learning model parameter data store 180. In some instances, machine learning trainer server 170 collects time-lapsed data to train one or more models. For example, over time, a confidence of an identification of a profile may increase. Thus, a profile identified later in the session and associated with a high confidence metric may be treated as a true result, which can be used to assess an accuracy of results generated based on communications received earlier in the session. As another example, different machine-learning models may be associated with different reliability metrics, such that a result of one machine-learning model can be used as a truth to evaluate a result of another machine-learning model.

While tag processing system 105 is shown in FIG. 1 to include multiple servers, it will be appreciated that a single server may function to perform actions described with respect to two, more or all of the depicted servers. Alternatively or additionally, multiple servers or devices may be used to perform actions described with respect to what is depicted in FIG. 1 as being a single server.

Figure 2:
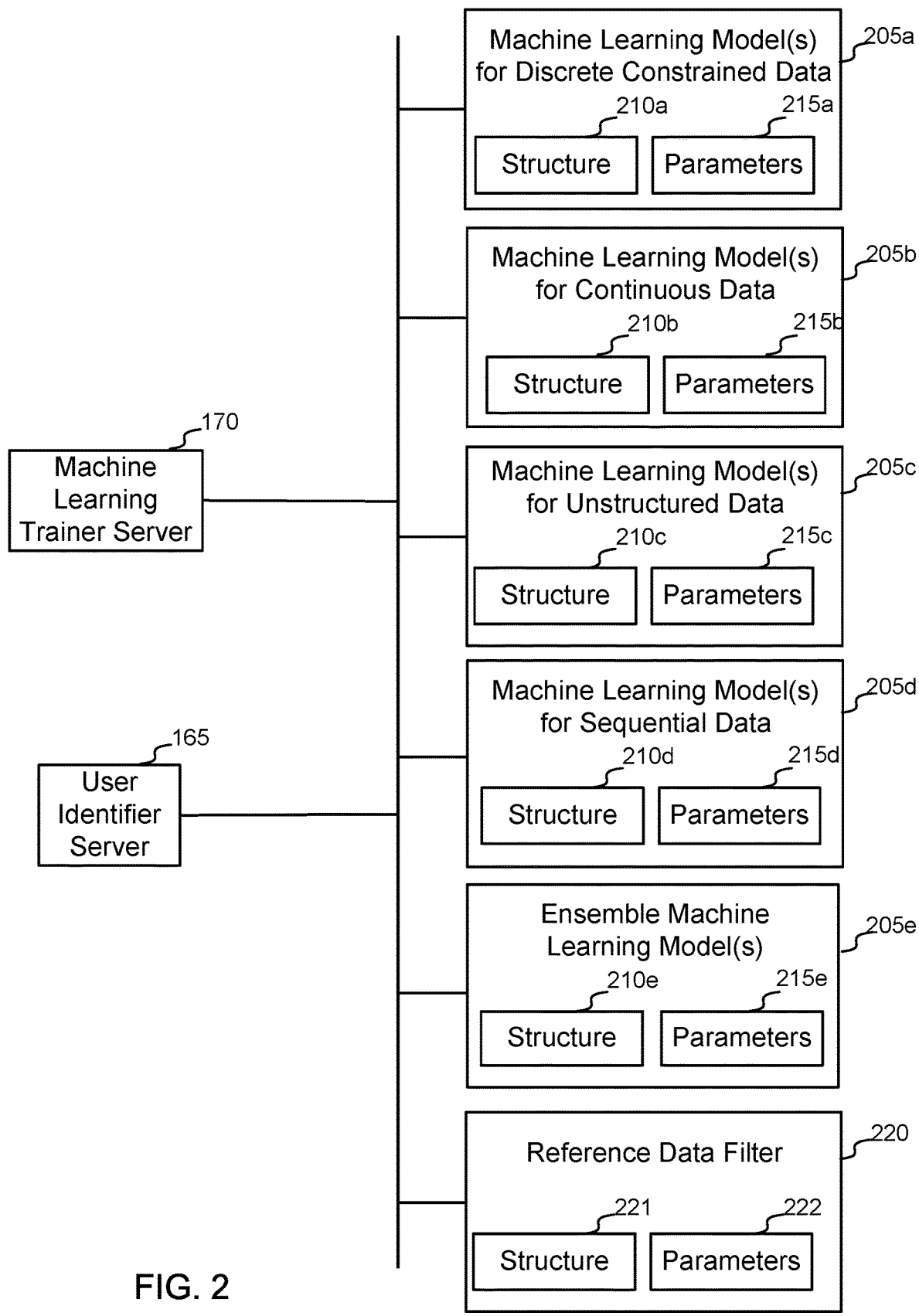
FIG. 2 shows various types machine-learning models used to process tag-based event communications according to some embodiments.

FIG. 2 shows various types machine-learning models used to process tag-based event communications according to some embodiments. As indicated above, user identifier server 165 can use a machine learning model to identify a profile estimation result based on one or more event communications, and machine learning trainer server 170 can use event communications to train machine learning models. A machine learning model may use supervised learning algorithm, semi-supervised learning algorithm or unsupervised learning algorithm.

FIG. 2 represents various types of machine learning models 205a-205e that can be used to identify a profile estimate result and/or that can be trained based on event communication(s). It will be appreciated that each of the depicted model types need not all be used. Each machine learning model 205a-205e includes a corresponding structure 210a-210e that includes one or more operations and/or one or more rules indicating how the models are to be trained and how the models are structured to transform one or more inputs into one or more outputs. Structures 210-210e are fixed, not learned, such they are consistently applied across iterations of use of the respective model. Each machine learning model 205a-205e further has one or more corresponding parameters 215a-215e, which can include one or more hyperparameters (including one or more variables that are not learned via the model but that affect the model's operation) and/or one or more other parameters (including one or more variables that are learned by the model). Parameters 215-215e can include one or more hard-coded parameters, one or more parameters set via input (e.g., received from a client device), and/or one or more parameters learned by the model (e.g., during a training period or during real-time performance).

Structures of various machine learning models affect an extent to which the model can, or an efficacy with which the model can, process different types of data. Thus, for each key-value pair, user identifier server 165 may identify a data type for the value. The data type may be known (e.g., due to its definition in a tag code initially sent from a tag processing system to a client system or due to a provided data-type indication identified via a communication received from a client system, such as one received in association with an adding of the key-value pair to the set of key-value pairs). In some instances, the data type is inferred. The estimation may be performed based on characterizing a value from an event communication being processed and/or one or more previously processed values. For example, if a value is a number, the data type may be estimated to be numeric unless and until a non-number value is received. As another example, non-numeric values may be characterized as unstructured data unless and until it is determined that unique values across event communications are under a first predefined threshold and a total number of event communications including a value for the key-value pair exceeds a second predefined threshold. As yet another example, values that have an array, matrix, or vector format may be characterized as being of sequential data type. In some instances, a model selection or parameter also depends on a distribution of potential values. When the distribution is not known, the distribution may be identified as a default type (e.g., Gaussian) unless and until a probability that observed values having been sampled from the default distribution type falls below a threshold.

A machine learning model for discrete constrained data 205a can have a structure 210a configured to receive input data that is one of a finite number of values. Examples of such types of values include browser type, geocountry, geostate, current client webpage, device model, device brand, operating system, browser version, and language. Exemplary models for discrete constrained data 205a include a decision tree model or logistic regression model.

A machine learning model for continuous data 205b can have a structure 210b configured to receive input data that is numeric. Examples of such types of values include a date/time of day, elapsed time on site or elapsed time on page. Exemplary models for continuous data 205b include a linear regression model, Kernel method model, or artificial neural network.

A machine learning model for unstructured data 205c can have a structure 210c configured to receive input data that is unstructured (e.g., of any length). Examples of such types of values include a referral webpage, title of current webpage or app page, or search query text. Exemplary models for unstructured data 205c include a topic modeling model or Latent Dirichlet Allocation model.

A machine learning model for sequential data 205d can have a structure 210d configured to receive input data that represents an ordered sequence of data. Examples of such types of values include a sequence of parts of a webpage, app page, website or app presented at a user device; a sequence of webpages or app pages accessed at a user device; time spent on various pages of a web site or app; and/or a sequence of types of inputs received via a web site or app. Sequential data may correspond to a single session or span across multiple sessions. As with unstructured data, structure 210d may be configured to accept inputs of varied lengths. Exemplary models for sequential data 205d include a Hidden Markov machine-learning model, a sliding window machine-learning model, a Maximum Entropy machine-learning model, an Input-Output Hidden Markov Model machine-learning model, a Conditional Random Fields machine-learning model, a Graph Transformer Network machine-learning model, a model using Kullback-Leibler divergence metrics to process sequential data, or a model using a Kalman filter to process sequential data.

In some instances, multiple key-value pairs from an event communication are identified as being of a given data type. In such instances, the values from the pairs may be processed individually or in combination via a model.

When multiple models are used, results can be combined to generate a final result for the event communication. In some instances, the results are combined using a weighted average or mode-based assessment. In some instances, the results are combined using an ensemble machine learning model 205e, which may (for example) learn weights and/or non-linear function attributes to combine the results. A weight assigned to a particular initial result may be learned to depend on (for example) the type of learning model used to produce the result, a confidence metric of the result, and/or a value of the result.

A machine learning model may process input data attempting to characterize it as being consistent with a particular stored profile from amongst a plurality of stored profiles. The processing may include, for example, generating—for each of multiple stored profiles—a metric that represents an extent to which the input data corresponds to data from the profile. However, performing this type of assessment may be computationally and temporally expensive if a large number of profiles are considered. Thus, a reference data filter 220 can be configured to select a subset of a plurality of stored profiles to be evaluated by one or more models. The subset may be selected by using a selection technique represented in a structure 221 that may include, for example, a pseudo-random selection technique, a technique that is biased towards selecting profiles associated with a recent session or a high number of sessions, a technique that enforces matching of at least some values from an event communication (e.g., a geocountry and geostate) and/or a technique that prioritizes entropy or variability amongst the subset. Structure 221 and/or one or more parameters 222 for the structure (e.g., to identify a degree of bias, a number of profiles to include in the subset and/or a technique selection) can be hard coded, defined based on input (e.g., received at a client system) or learned.

Figure 3A:
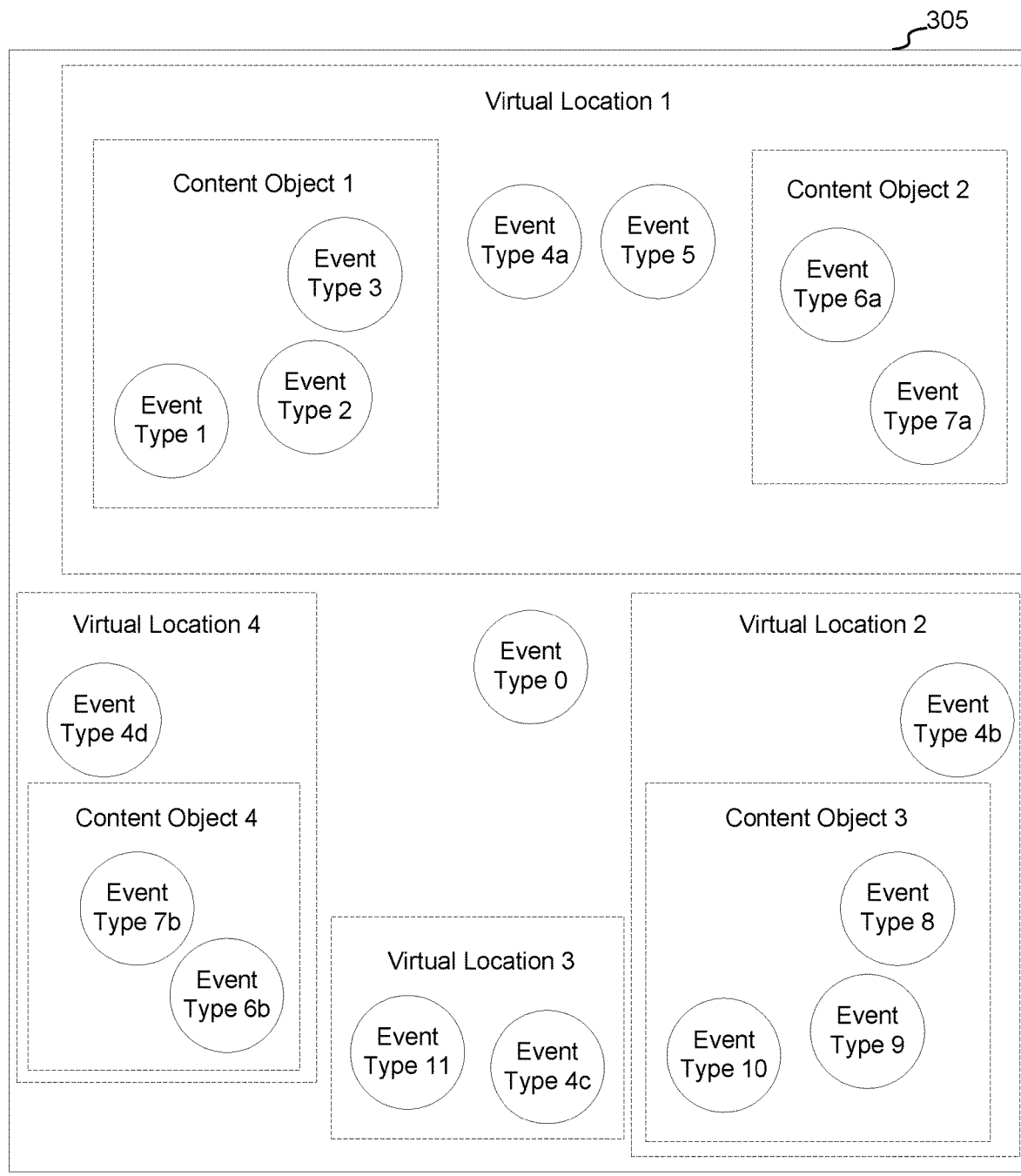
FIGS. 3A-3E provide illustrations of generating sequential data based on ordered tracking of interaction events.

FIGS. 3A-3E provide illustrations of generating sequential data based on ordered tracking of interaction events. FIG. 3A shows representations of various types of events included in a predefined set of events 305. Each event type, except Event Type 0, is associated with a virtual location, which can include a webpage or an app page. Event Type 0 can represent ending a session by (for example) leaving a web site or app. Some, but not all, of the event types are associated with particular content objects. Some event types correspond to similar action types. For example, Event Types 4a, 4b, 4c and 4c may represent landing at the particular Virtual Location; Event Types 6a and 6b may represent having a cursor over Content Object 2; and Event Types 7a and 7b may represent clicking on Content Object 4. Exemplary types of content objects include images, videos, files, links and/or input components configured to accept input. As one illustration, Content Object 1 may correspond to a video object, where Event Types 1, 2 and 3 may represent starting, pausing and completing the video, respectively.

Figure 3B:
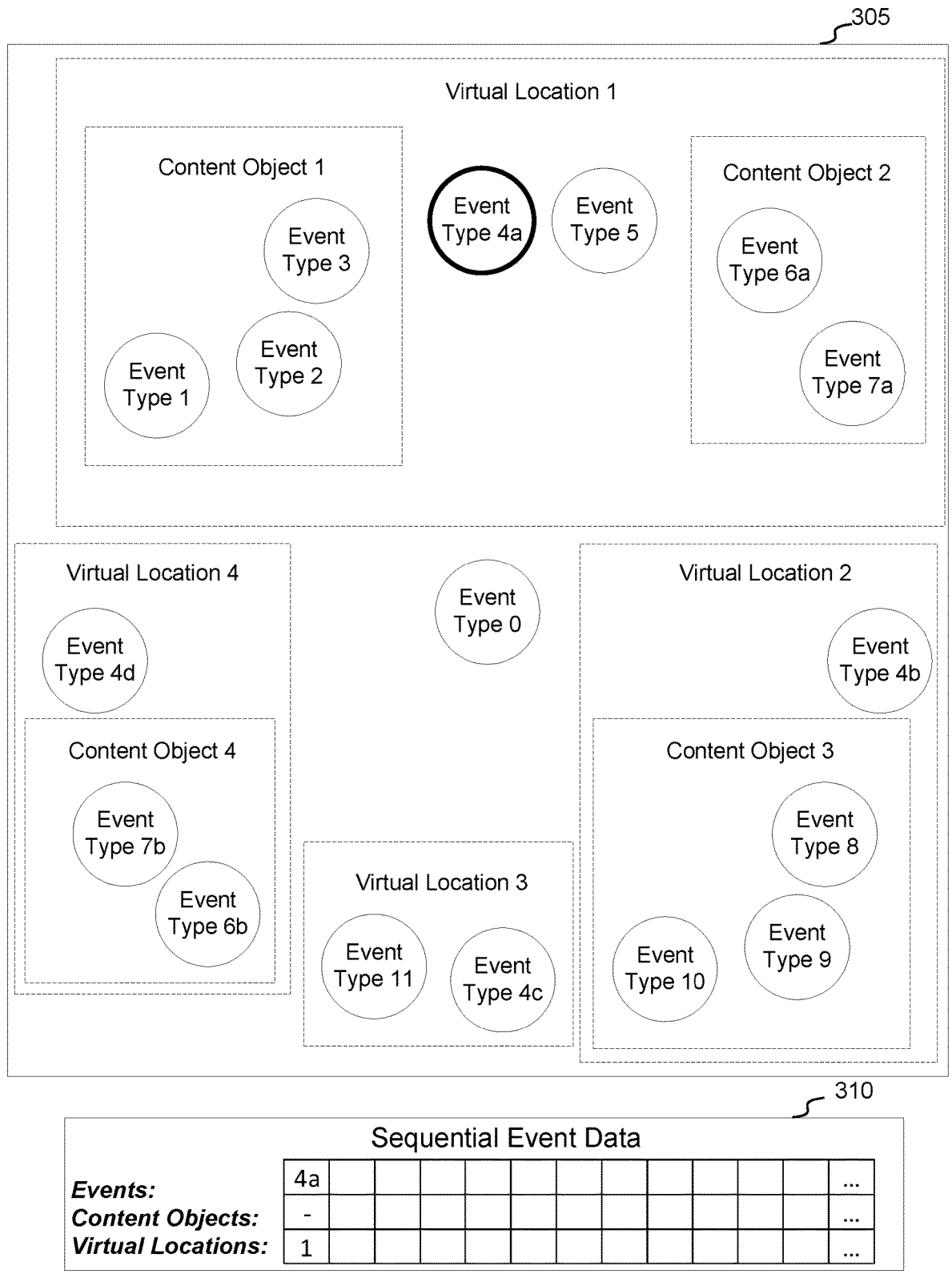

FIG. 3B shows a representation of having detected, at a user device and within a session, an event of Event Type 4a, where the user device has landed at Virtual Location 1 (e.g., a first webpage or first app page). Tag code may cause an event communication to be generated and transmitted that identifies the event. Tag processing system may initialize a sequential event data structure 310 for the session, and a first event can be identified to be of the Event Type 4a. In the depicted instance, sequential event data structure 310 is configured to further track other data elements associated with the event, which may be determined based on a definition of the event type or from an event communication. Thus, in FIG. 3B, sequential event data structure 310 include a representation only of a first event (and its associated virtual location).

Figure 3C:
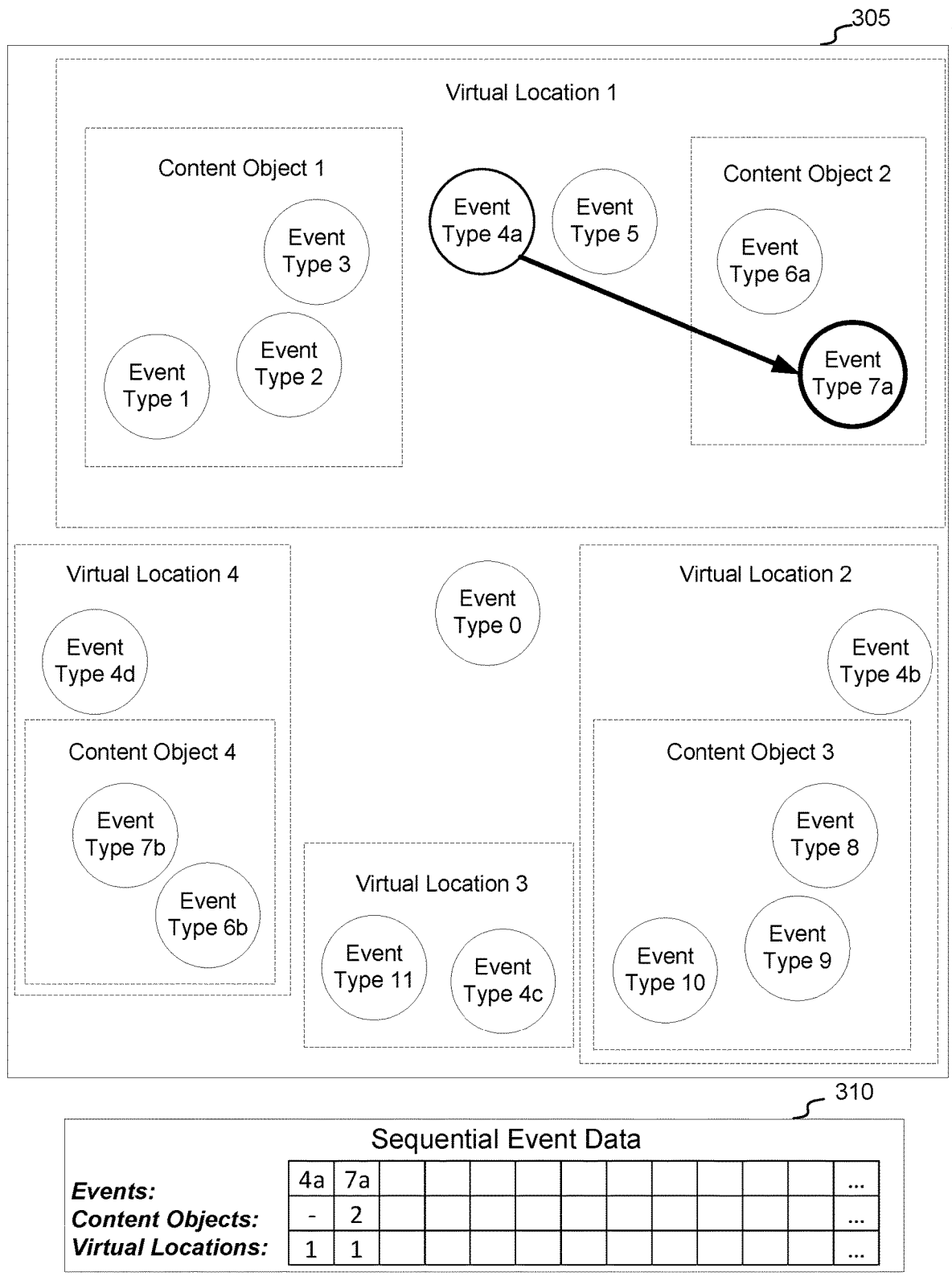

FIG. 3C shows a representation of having detected, at the user device and within the session, an event of Event Type 7a, where the user has clicked on Content Object 2. In response to the detection, the user device can generate and transmit, to the tag processing system, another event communication that identifies the event. The tag processing system can update sequential event data structure 310 to identify the event type (and, in the depicted instance, the associated content object and virtual location) and to indicate that the event occurred after Event Type 4a.

Figure 3D:
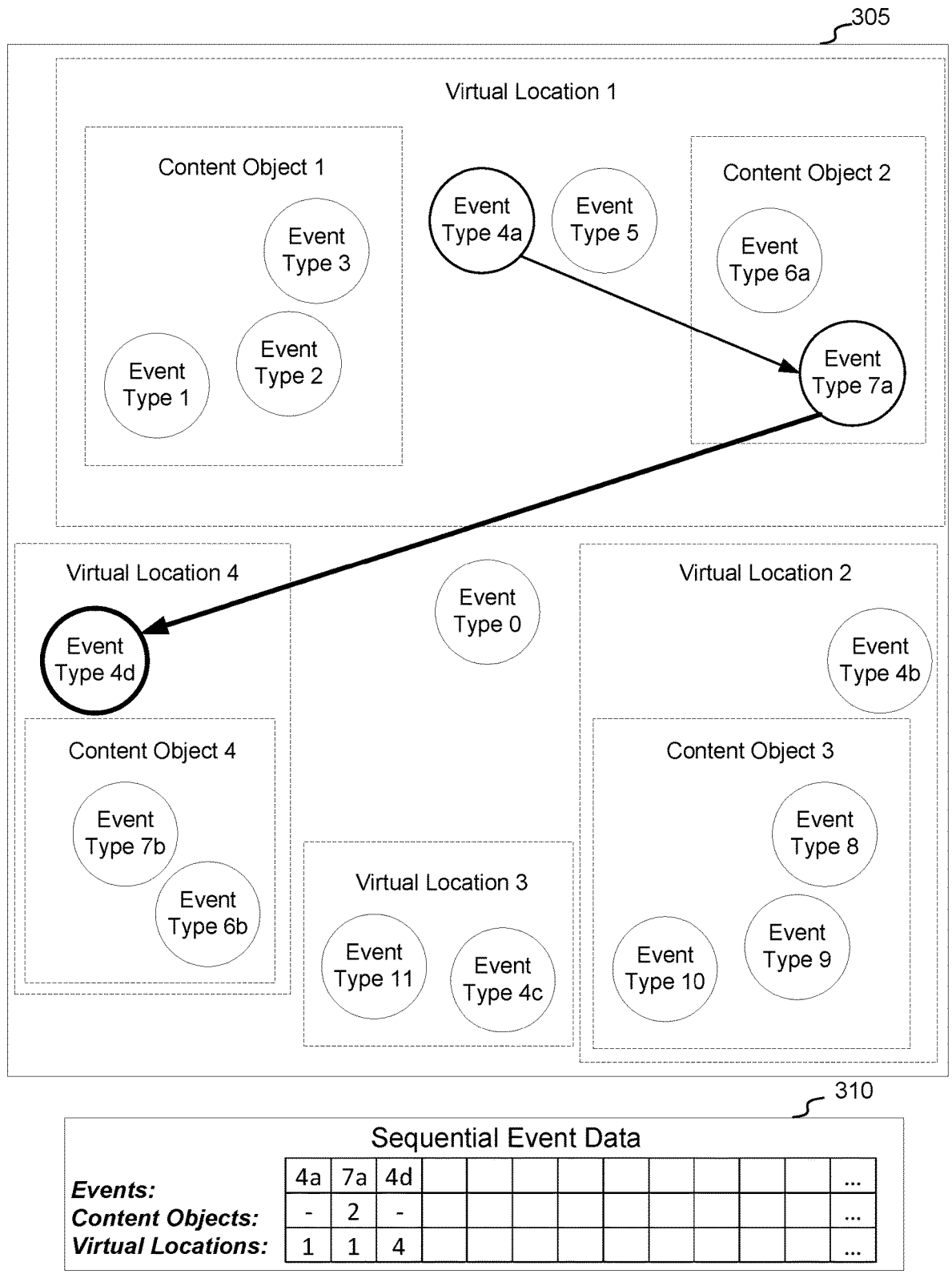
Figure 3E:
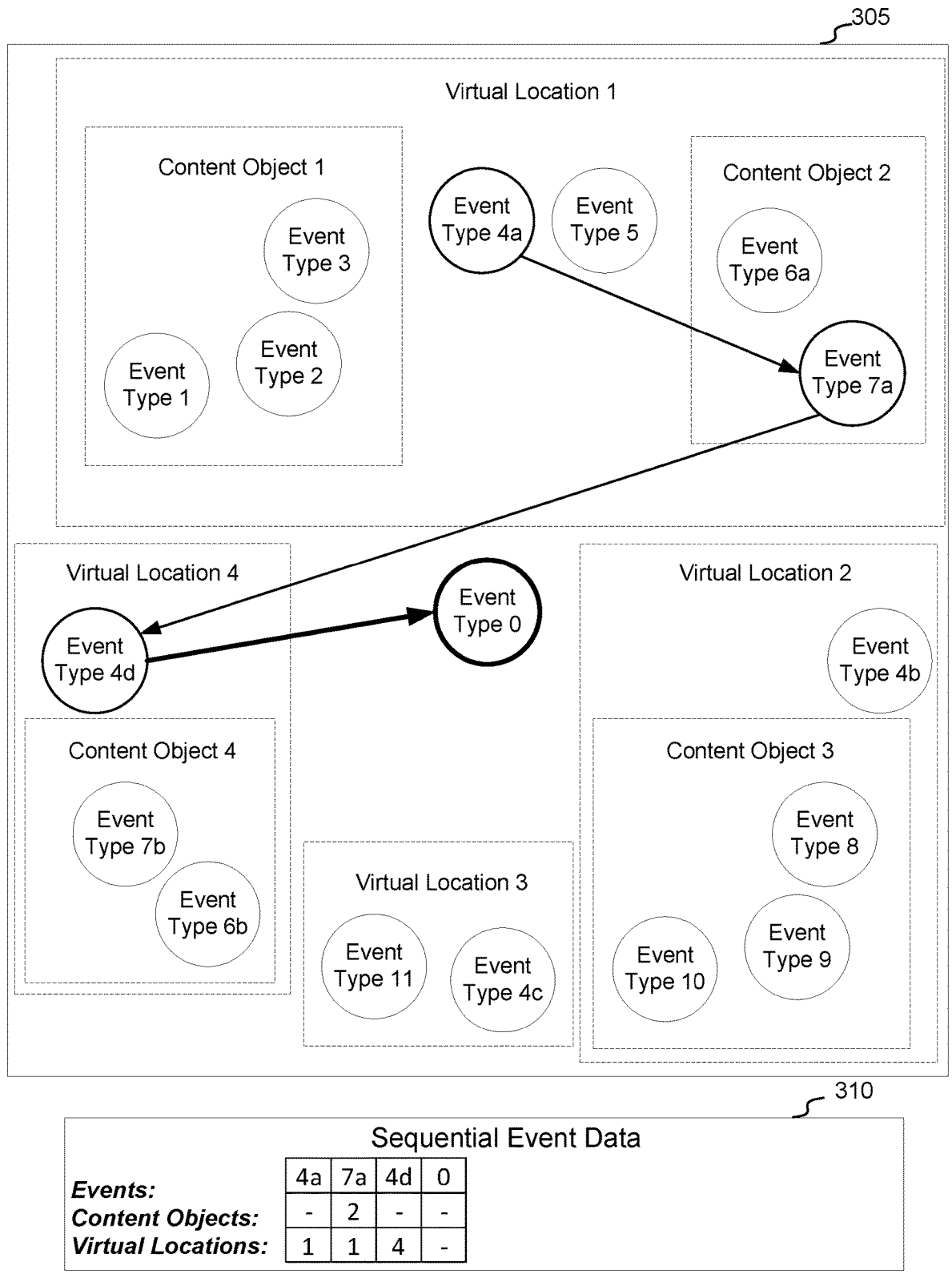

FIG. 3D shows a representation of having detected, at the user device and within the session, an event of Event Type 4d, where the user device has landed at Virtual Location 4 (e.g., another webpage or app page). FIG. 3E shows a representation of having detected, at the user device and within the session, an event of Event Type 0, where the user device has ended the session (e.g., by leaving the web site or app). In response to each detection, the user device can generate and transmit, to the tag processing system, yet another event communication that identifies the event. The tag processing system can update the sequential event data structure in response to receiving the additional event communications. Upon the indication that the session has ended, sequential event data structure 310 may be closed, such that additional elements are not to be added.

The tag processing system can process the sequential event data structure using a machine learning model to facilitate identifying a profile. In some instances, the sequential event data structure is processed after receiving each event communication, such that it can be used for profile identifications transmitted to a client device during the session (e.g., to facilitate dynamic content selection). In some instances, the sequential event data structure is processed after the structure is closed.

Figure 4:
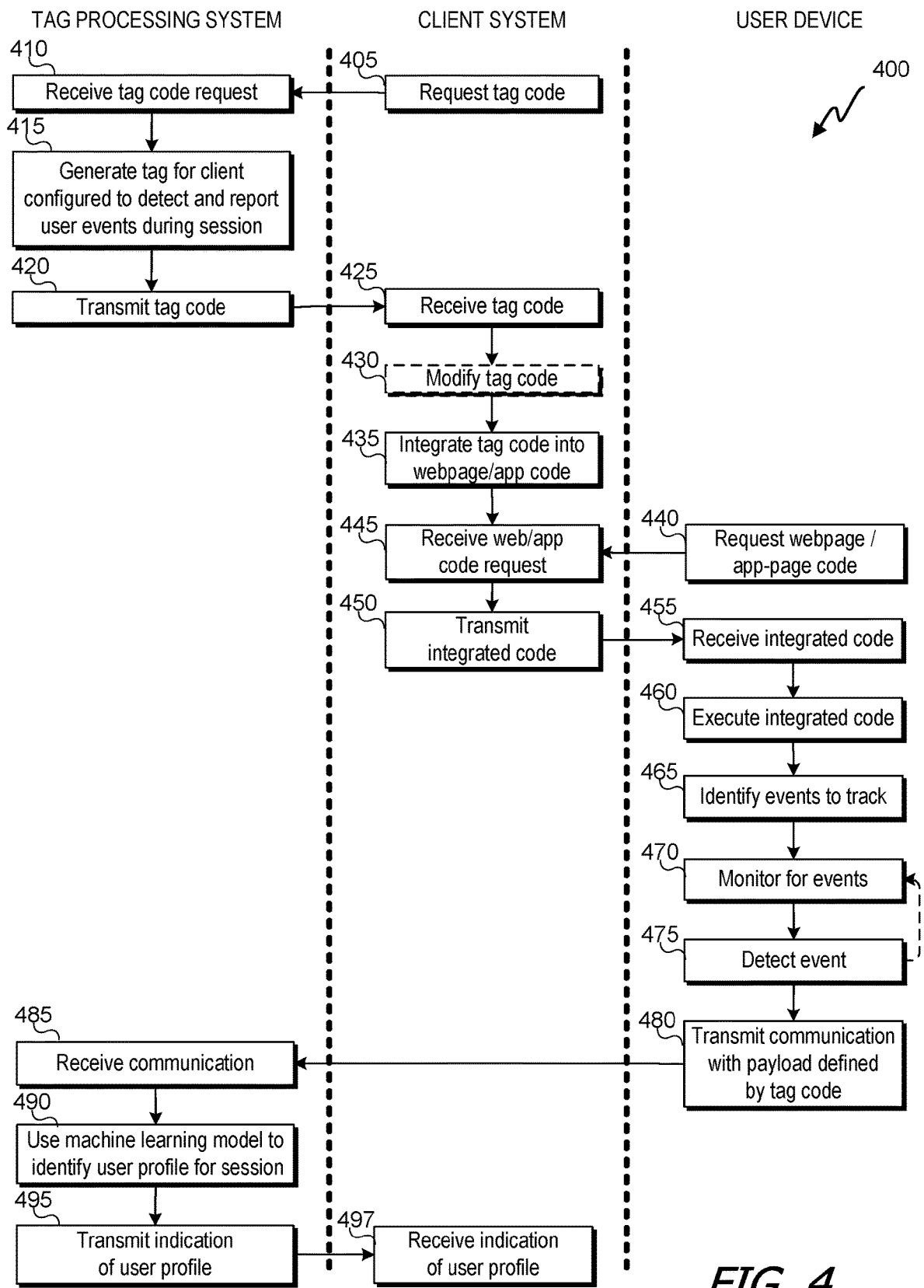
FIG. 4 shows a flow diagram representing actions performed across multiple systems to use tag codes and machine learning to track and process user interaction events according to some embodiments.

FIG. 4 shows a flow diagram 400 representing actions performed across multiple systems to use tag codes and machine learning to track and process user interaction events according to some embodiments. Flow diagram 400 represents actions performed by and communications transmitted between a tag processing system (e.g., tag processing system 105), a client system (e.g., a client system 110), and a user device (e.g., a user device 115).

At block 405, the client system sends a request for tag code to the tag processing system, which receives the request at block 410. At block 415, the tag processing system generates the tag code for the client system. The tag code is configured to, upon execution, detect and report (via transmitting an event communication to the tag system) any of a set of predefined events occurring during interaction with a web site or app. At block 420, the tag processing system transmits the tag code to the client system, which receives the tag code at block 425.

Optionally, at block 430, the client system modifies the tag code. The modification may include (for example) adding a new event to the set of predefined events, removing a new event to the set of predefined events, adding a new key-value pair to be included in a reporting event communication, modifying a key-value pair to be included in a reporting event communication and/or removing a key-value pair to be included in a reporting event communication.

At block 435, the client system integrates the tag code into one or more webpage codes and/or one or more app page codes. The integration can include, for example, inserting the tag code (e.g., Javascript tag code) into the webpage code(s) and/or app-page code(s).

At block 440, a user device transmits a request for code for a webpage or app page, which is received at the client system at block 445. In some instances, a web server or app server that is included within or otherwise associated with the client system receives the request. The request can identify a particular webpage or app page for which the tag code has been integrated. At block 445, the client system transmits the integrated code to the user device, which receives the integrated code at block 455.

At block 460, the user device executes the integrated code, which may cause the requested app page or webpage to be displayed. The execution can further include executing the tag code, which can cause—at block 465—the user device to identify a set of events to be tracked. In some instances, the tag code identifies the event. In some instances, the tag code includes instructions to request identification of the set of events from a remote device.

At block 470, the user device monitors for an occurrence of any of the set of events. The monitoring may include determining whether user input detected at the device matches or corresponds with a definition of any of the set of events. For example, an event may indicate that a particular event includes clicking on any link that is within a class of links. Thus, the monitoring may include determining, for each link selection, whether the link is of the class (based on an HTML tag of the link).

At block 475, the user device detects an event of a type indicated in the set of predefined events. In response to the detection, the user device can identify a value for each of one or more key-value pairs to be included in a reporting event communication. The values can be determined based on, for example, execution of the tag code, processing of metadata, etc.

At block 480, the user device transmits an event communication with a payload defined by the tag code, and the tag processing system receives the communication at block 485. The payload can include particular key-value pairs.

At block 490, the tag processing system uses one or more machine learning models to identify a user profile for the session. More specifically, values from the key-value pairs can be processed to identify the user profile. In some instances, each of multiple subsets of the values is processed using different machine learning model and the results from the initial processing are aggregated and further processed (e.g., using an ensemble machine learning model) to identify the user profile.

At block 495, the tag processing system transmits an indication of the user profile to the client system, which receives the indication at block 497. The indication may include (for example) an identifier of the profile and/or part of all of the profile (e.g., including data generated based on one or more previous sessions).

Figure 5:
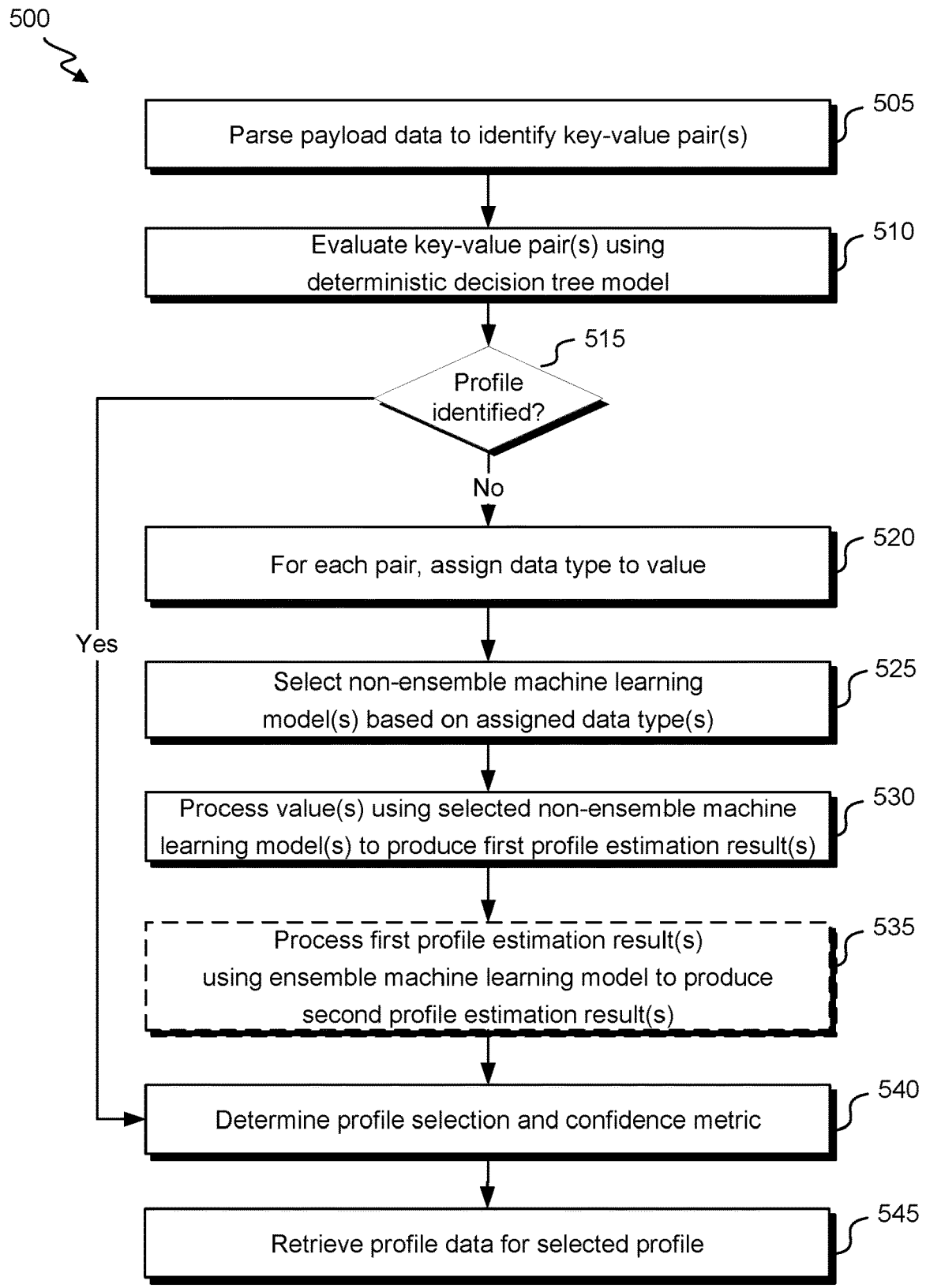
FIG. 5 shows a process for processing tag-based event communications using machine learning according to some embodiments.

FIG. 5 shows a process 500 for processing tag-based event communications using machine learning according to some embodiments. Process 500 can be performed, in part or in its entirety, by a tag processing system (e.g., tag processing system 105). Part or all of process 500 may be performed as part of block 490 in flow diagram 400.

At block 505, payload data in a received communication is parsed to identify one or more key-value pairs. The parsing can include, for example, detecting one or more particular delimiters (e.g., one or more predefined characters). In some instances, the parsing occurs based on a known or estimated structure, signature or skeleton that is associated with the event communication.

At block 510, the one or more key-value pairs are evaluated using a deterministic decision tree model. The deterministic decision tree can represent one or more hard rules (e.g., not having been learned). The deterministic decision tree can indicate that if valid login information is represented in at least one key-value pair, the profile is to be identified as one that corresponds with the login information. As another example, the deterministic decision tree can identify one or more values, which, if detected, indicate that the user is a new user (e.g., such that no pre-existing profile is identified).

At block 515, it is determined whether a profile is identified based on the evaluation using the deterministic decision tree model. If so, process 500 proceeds to block 540 where a profile selection and confidence metric is determined. In this instance, the confidence may be set to a predefined value (e.g., 100%) and the profile selection can be made in accordance with a hard rule of the deterministic decision tree model.

If it is determined, at block 515, that a profile has not been identified based on the evaluation using the deterministic decision tree model, process 500 continues to block 520, where a data type is assigned to each value from the identified key-value pair(s). For a given key-value pair, the data type can be assigned based on, for example, a type of data included in the value, a type of data included in the key-value pair across one or more previously received event communications, client-identified data, a number of unique values detected for the key-value pair across a current and previously received processed event communications, and so on. Exemplary types of data include discrete and constrained data; numeric data; unstructured data (e.g., text data) and sequential data.

At block 525, one or more non-ensemble machine learning models are selected based on the assigned data types. In some instances, the one or more non-ensemble machine learning models are selected to ensure that each type of data from the value(s) of the key-value pair(s) can be processed. The selection can include evaluating a configuration for one or more machine learning models to determine which type(s) of input are accepted. The non-ensemble nature of the model can indicate that the model does not rely on performance of multiple machine learning models to produce its result.

At block 530, the value(s) from the identified key-value pair(s) are processed using the selected non-ensemble machine learning model(s) to produce one or more first profile estimation results. At optional block 535, the first profile estimation result(s) are processed using an ensemble machine learning model to produce one or more second profile estimation results. For example, the processing may include weighting each of the first profile estimation results. The weight(s) may be learned based on a degree to which one or more previous results from the model were predictive of a correct result and/or any variables that influence such prediction power.

At block 540, a profile selection and confidence metric is determined. In some instances (e.g., when block 535 is not performed), the one or more first profile estimation results include an identification of the profile and the confidence metric. In some instances (e.g., when block 535 is performed), the one or more second profile estimation results include an identification of the profile and the confidence metric.

Figure 6:
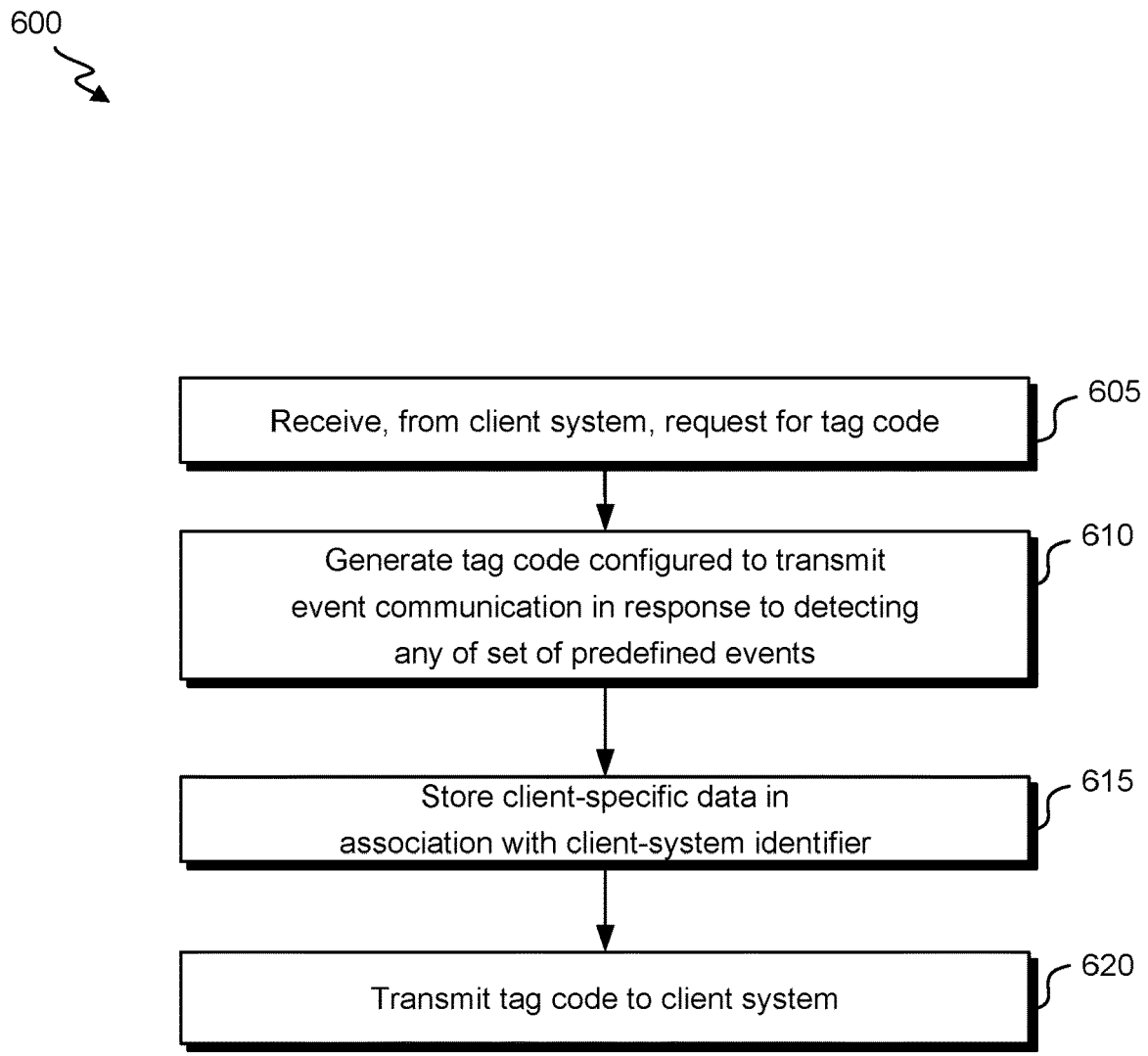
FIG. 6 shows a process for distributing tag code to client systems according to some embodiments.

FIG. 6 shows a process 600 for processing tag-based event communications using machine learning according to some embodiments. Process 600 can be performed, in part or in its entirety, by a tag processing system (e.g., tag processing system 105).

Process 600 begins at block 605, a request for a tag code is received from a client system. At block 610, tag code is generated. Generating the tag code can include retrieving tag code, retrieving part of the tag code and/or adding client-specific data to a tag-code template. The client-specific data can be unique relative to other client-specific data associated with other tag code generated for one or more other clients. The tag code can be configured to be integrated with one or more codes for one or more app pages or for one or more webpages. For example, the tag code can include one or more lines of Javascript code that can be added to HTML code. The tag code can be configured to, upon execution, monitor to detect occurrence of any of the set of predefined events, each corresponding to an app-page or webpage interaction. Execution of the tag code can further result in, upon detecting an event corresponding to a predefined event of the set of predefined events, identifying for each key-value pair of a set of key-value pairs, a value for the key-value pair and transmitting an event communication to the tag processing system that includes the set of key-value pairs and the client-specific data. The set of key-value pairs can be defined in configuration data included in the tag code or called for in response to execution of the tag code.

At block 615, the client-specific data is stored in association with an identifier of the client system. The identifier may identify (for example) a web site, a domain, an app, a client name, a and/or system identifier. At block 620, the tag code is transmitted to the client system.

Figure 7:
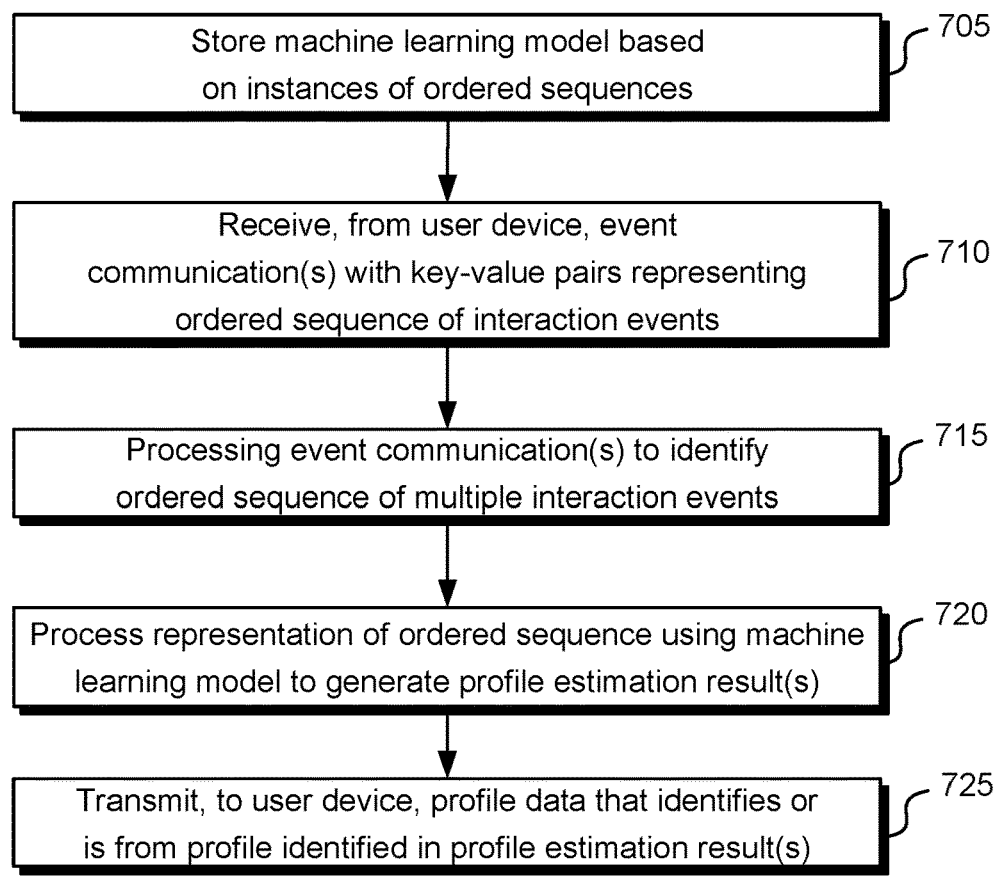
FIG. 7 shows a process for processing tag-based event communications using machine learning according to some embodiments.

FIG. 7 shows a process for processing tag-based event communications using machine learning according to some embodiments. At block 705, a machine learning model is stored. In some instances the stored model includes multiple sub-models, which can include a model disclosed herein. The machine learning model can be based at least in part on different detected instances of ordered sequences of same and different interaction events in same or different orders. For example, one or more parameters can be generated based on the detected instances. The detected instances can include sequences identified in response to receiving communications from different sources (e.g., user devices) transmitted in response to execution of tag code at the user devices. The machine learning model can be configured to be used to process a subsequently received ordered sequence to generate an output that corresponds to an estimate as to which one or more sources of the different sources are associated with the subsequently received ordered sequence. For example, the output can include identifying a profile (or variable from within a profile) from amongst a set of profiles to associate with the sequence, or the output can include, for each of one or more profiles, a probability or rank order corresponding to an estimated likelihood that the ordered sequence corresponds to the profile.

The machine learning model can include one generated by executing a machine learning process to analyze the different instances of ordered sequences (e.g., and, in some instances, one or more other types of data). The machine learning process can include a training process configured to adjust one or more parameters of the machine learning model (e.g., which can include adjusting one or more parameters of a sub-model) based on the iterations. The machine learning process can be configured to detect patterns in the different detect instances and to adjust the machine learning model to strengthen (or weaken) associations between the pattern and one or more particular profiles (e.g., by adjusting one or more weights, intermediate node values, cost function parameters, etc.).

At block 710, one or more event communications are received from a user device. Each of the one or more event communications includes a set of key-value pairs. The set(s) of key-value pairs represent an ordered sequence of multiple interaction events. For example, multiple event communications may be received—each representing an occurrence of a recent event, such that the sequence of multiple interaction events includes each represented event and an order that corresponds to times at which the communications were received or timestamps in the event communications. As another example, a single event communication can include one or more key value pairs that identifies multiple recently detected events and an order of the events. Each interaction event of the multiple interaction events can include a predefined event of a set of predefined events (e.g., a set defined by the tag processing system or a set at least partly defined based on input from the client system). Each communication of the one or more event communications can be a communication generated via execution of the tag code integrated with code of an app page or of a webpage. Each communication of the one or more event communications can include the client-specific data.

At block 715, the one or more event communications are processed to identify the ordered sequence of the multiple interaction events. The processing can include extracting at least two values from the one or more sets of key-value pairs. The processing may further include, for example, ordering the events in accordance with timestamps in or otherwise associated with the communication(s).

At block 720, a representation of the ordered sequence of the multiple interaction events is processed using the machine learning model to generate one or more profile estimation results. The one or more profile estimation results can include an identification of a particular user profile from amongst a set of stored user profiles. The identification can include, for example, an index or other identifier of a single profile (e.g., and a confidence metric associated with selection of the profile) or an index or other identifier of each of two or more profiles (e.g., and a confidence indication for each profile estimating a likelihood that it correspond to an event communication). The one or more profile estimation results can identify information about a source of the ordered sequence of the multiple interaction events. For example, the one or more profile estimation results can include or represent. a destination address for profile data, name of a user, IP address of a device, other device identifier (e.g., MAC address), device configuration, and/or past virtual interactions.

At block 725, profile data that identifies the particular user profile or is from the particular user profile. The profile data can include, for example, an index or other identifier of a single profile (e.g., and a confidence metric associated with selection of the profile) or an index or other identifier of each of two or more profiles (e.g., and a confidence indication for each profile estimating a likelihood that it correspond to an event communication). The profile data may alternatively or additionally include part or all of an identified profile. The transmission may further include other data from the event communication and/or associated with the user device. For example, the transmission may include a session identifier, user-device identifier, webpage identifier, and so on.

Some disclosures herein relate to events that represent interactions with a virtual interface (e.g., a webpage or app page). It will be appreciated that other types of interactions and/or events may be processed. For example, event communications may represent data collected by one or more sensors (e.g., measuring biometric data of a user, a location, a speed, an acceleration, etc.). As another example, event communications may represent data collected at one or more Internet of Things (IoT) devices and/or one or more smart home devices. For example, an event communication may represent that an input was detected corresponding to request to set a setting to a particular setting option (e.g., identifying a station on a smart television, temperature on a smart thermostat, coffee type on a smart coffee maker, etc.) or that a power setting of an IoT and/or smart home device changed (e.g., was turned on or off). Times and/or types of one or more of these events (e.g., particular sensor measurements, IoT setting, power setting, etc.) may be processed using a machine learning model for sequential data (or other type of model).

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer-implemented method for processing tag-based event communications using machine learning, the method comprising:

storing a machine learning model that is based at least in part on a set of detected instances of ordered sequences of interaction events, the interaction events being from different sources, at least two detected instances of ordered sequences of interaction events including a different combination of interaction events, at least two detected instances of ordered sequences of interaction events including a different sequence of interaction events, the machine learning model having been generated by executing a machine learning process to analyze the set of detected instances of ordered sequences based on patterns in the set of detected instances of ordered sequences, and the machine learning model being configured to process a subsequently received ordered sequence of interaction events to generate an output that corresponds to an estimate as to which one or more sources of the different sources are associated with the subsequently received ordered sequence of interaction events;

receiving, from a user device and at a tag processing system, one or more event communications that include one or more sets of key-value pairs representing an ordered sequence of multiple interaction events, each interaction event of the multiple interaction events including a predefined event of a set of predefined events, each communication of the one or more event communications having been generated via execution of tag code integrated with code of an app page or of a webpage, and each communication of the one or more event communications including client-specific data;

processing, at the tag processing system, the one or more event communications to identify the ordered sequence of the multiple interaction events, the processing including extracting at least two values from the one or more sets of key-value pairs;

processing a representation of the ordered sequence of the multiple interaction events using the machine learning model to generate one or more profile estimation results, the one or more profile estimation results including an identification of a particular user profile from amongst a set of stored user profiles that identifies;

identifying a client system using the client-specific data;

transmitting, to the client system and from the tag processing system, profile data that identifies the particular user profile or is from the particular user profile;

receiving, from the client system and at the tag processing system, a request communication corresponding to a request for a tag code;
generating, at the tag processing system, the tag code, the tag code including the client-specific data that is unique relative to client-specific data associated with other tag code generated for one or more other clients, and the tag code being configured to be integrated with one or more codes for one or more app pages or for one or more webpages and to, upon execution:
  monitor to detect occurrence of any of the set of predefined events, each predefined event of the set of predefined events including an app-page or webpage interaction; and
  upon detecting an event corresponding to a predefined event of the set of predefined events:
    identify, for each key-value pair of a set of key-value pairs, a value for the key-value pair; and
    transmit an event communication to the tag processing system that includes the set of key-value pairs and the client-specific data;
storing the client-specific data in association with an identifier of the client system; and
transmitting the tag code to the client system.

2. The computer-implemented method for processing tag-based event communications using machine learning as recited in claim 1, wherein the machine learning model includes:
  a Hidden Markov machine-learning model;
  a sliding window machine-learning model;
  a Maximum Entropy machine-learning model;
  an Input-Output Hidden Markov Model machine-learning model;
  a Conditional Random Fields machine-learning model;
  a Graph Transformer Network machine-learning model;
  a model using Kullback-Leibler divergence metrics to process sequential data; or
  a model using a Kalman filter to process sequential data.

3. The computer-implemented method for processing tag-based event communications using machine learning as recited in claim 1, wherein each event of the multiple interaction events represents an interaction with a page associated with the client system, the page including a webpage on a domain associated with the client system or an app page of an app associated with the client system, the interaction including:
  landing on the page;
  leaving the page;
  viewing a particular portion of the page;
  providing input using one or more input-accepting fields of the page;
  positioning a cursor on a particular part of the page; or
  interacting with a content object presented on the page.

4. The computer-implemented method for processing tag-based event communications using machine learning as recited in claim 1, wherein receiving the one or more event communications includes:
  receiving, from the user device and at a first time, a first event communication of the one or more event communications that includes a first set of key-value pairs of the one or more sets of key-value pairs, the first set of key-value pairs including at least one first value that represents a first interaction event; and
  receiving, from the user device and at a second time, a second event communication of the one or more event communications that includes a second set of key-value pairs of the one or more sets of key-value pairs, the first set of key-value pairs including at least one second value that represents a second interaction event, the second time being after the first time, and the ordered sequence of the multiple interaction events indicating that the second interaction event occurred after the first interaction event.

5. The computer-implemented method for processing tag-based event communications using machine learning as recited in claim 1, wherein:
  the one or more profile estimation results further includes a confidence metric; and
  the computer-implemented method further includes:
    determining that the confidence metric exceeds a predefined threshold, wherein the profile data is transmitted to the client system in response to determining that the confidence metric exceeds a predefined threshold.

6. The computer-implemented method for processing tag-based event communications using machine learning as recited in claim 1, further comprising:
  identifying a plurality of stored user profiles, each stored user profile of the plurality of stored user profiles including key-value data identified from one or more previous event communications; and
  filtering, using a subset-selection technique, the plurality of stored user profiles to identify the set of stored user profiles, wherein the plurality of stored user profiles include more stored user profiles than does the set of stored user profiles, wherein the processing the representation of the ordered sequence includes performing a comparison analysis that uses at least part of the representation of the ordered sequence of the multiple interaction events and at least part of each of the set of stored user profiles.

7. A computer-program product tangibly embodied in a non-transitory machine-readable storage medium, including instructions configured to cause one or more data processors to perform actions including:
  storing a machine learning model that is based at least in part on a set of detected instances of ordered sequences of interaction events, the interaction events being from different sources, at least two detected instances of ordered sequences of interaction events including a different combination of interaction events, at least two detected instances of ordered sequences of interaction events including a different sequence of interaction events, the machine learning model having been generated by executing a machine learning process to analyze the set of detected instances of ordered sequences based on patterns in the set of detected instances of ordered sequences, and the machine learning model being configured to process a subsequently received ordered sequence of interaction events to generate an output that corresponds to an estimate as to which one or more sources of the different sources are associated with the subsequently received ordered sequence of interaction events;
  receiving, from a user device, one or more event communications that include one or more sets of key-value pairs representing an ordered sequence of multiple interaction events, each interaction event of the multiple interaction events including a predefined event of a set of predefined events, each communication of the one or more event communications having been generated via execution of tag code integrated with code of an app page or of a webpage, and each communication of the one or more event communications including client-specific data;

processing the one or more event communications to identify the ordered sequence of the multiple interaction events, the processing including extracting at least two values from the one or more sets of key-value pairs;

processing a representation of the ordered sequence of the multiple interaction events using the machine learning model to generate one or more profile estimation results, the one or more profile estimation results including an identification of a particular user profile from amongst a set of stored user profiles that identifies;

identifying a client system using the client-specific data; and transmitting, to the client system, profile data that identifies the particular user profile or is from the particular user profile;

receiving, from the client system, a request communication corresponding to a request for a tag code;

generating the tag code, the tag code including the client-specific data that is unique relative to client-specific data associated with other tag code generated for one or more other clients, and the tag code being configured to be integrated with one or more codes for one or more app pages or for one or more webpages and to, upon execution:
  monitor to detect occurrence of any of the set of predefined events, each predefined event of the set of predefined events including an app-page or webpage interaction; and
  upon detecting an event corresponding to a predefined event of the set of predefined events:
    identify, for each key-value pair of a set of key-value pairs, a value for the key-value pair; and
    transmit an event communication that includes the set of key-value pairs and the client-specific data;

storing the client-specific data in association with an identifier of the client system; and transmitting the tag code to the client system.

8. The computer-program product as recited in claim 7, wherein the machine learning model includes:
  a Hidden Markov machine-learning model;
  a sliding window machine-learning model;
  a Maximum Entropy machine-learning model;
  an Input-Output Hidden Markov Model machine-learning model;
  a Conditional Random Fields machine-learning model;
  a Graph Transformer Network machine-learning model;
  a model using Kullback-Leibler divergence metrics to process sequential data; or
  a model using a Kalman filter to process sequential data.

9. The computer-program product as recited in claim 7, wherein each event of the multiple interaction events represents an interaction with a page associated with the client system, the page including a webpage on a domain associated with the client system or an app page of an app associated with the client system, the interaction including:
  landing on the page;
  leaving the page;
  viewing a particular portion of the page;
  providing input using one or more input-accepting fields of the page;
  positioning a cursor on a particular part of the page; or
  interacting with a content object presented on the page.

10. The computer-program product as recited in claim 7, wherein receiving the one or more event communications includes:
  receiving, from the user device and at a first time, a first event communication of the one or more event communications that includes a first set of key-value pairs of the one or more sets of key-value pairs, the first set of key-value pairs including at least one first value that represents a first interaction event; and
  receiving, from the user device and at a second time, a second event communication of the one or more event communications that includes a second set of key-value pairs of the one or more sets of key-value pairs, the first set of key-value pairs including at least one second value that represents a second interaction event, the second time being after the first time, and the ordered sequence of the multiple interaction events indicating that the second interaction event occurred after the first interaction event.

11. The computer-program product as recited in claim 7, wherein:
  the one or more profile estimation results further includes a confidence metric; and
  the actions further include:
    determining that the confidence metric exceeds a predefined threshold, wherein the profile data is transmitted to the client system in response to determining that the confidence metric exceeds a predefined threshold.

12. The computer-program product as recited in claim 7, wherein the actions further include:
  identifying a plurality of stored user profiles, each stored user profile of the plurality of stored user profiles including key-value data identified from one or more previous event communications; and
  filtering, using a subset-selection technique, the plurality of stored user profiles to identify the set of stored user profiles, wherein the plurality of stored user profiles include more stored user profiles than does the set of stored user profiles, wherein the processing the representation of the ordered sequence includes performing a comparison analysis that uses at least part of the representation of the ordered sequence of the multiple interaction events and at least part of each of the set of stored user profiles.

13. A system for processing tag-based event communications using machine learning, the system comprising:
  one or more data processors; and
  a non-transitory computer readable storage medium containing instructions which when executed on the one or more data processors, cause the one or more data processors to perform actions including:
    storing a machine learning model that is based at least in part on a set of detected instances of ordered sequences of interaction events, the interaction events being from different sources, at least two detected instances of ordered sequences of interaction events including a different combination of interaction events, at least two detected instances of ordered sequences of interaction events including a different sequence of interaction events, the machine learning model having been generated by executing a machine learning process to analyze the set of detected instances of ordered sequences based on patterns in the set of detected instances of ordered sequences, and the machine learning model being configured to process a subsequently received ordered sequence of interaction events to generate an output that corresponds to an estimate as to which one or more sources of the different sources are associated with the subsequently received ordered sequence of interaction events;

receiving, from a user device, one or more event communications that include one or more sets of key-value pairs representing an ordered sequence of multiple interaction events, each interaction event of the multiple interaction events including a predefined event of a set of predefined events, each communication of the one or more event communications having been generated via execution of tag code integrated with code of an app page or of a webpage, and each communication of the one or more event communications including client-specific data;

processing the one or more event communications to identify the ordered sequence of the multiple interaction events, the processing including extracting at least two values from the one or more sets of key-value pairs;

processing a representation of the ordered sequence of the multiple interaction events using the machine learning model to generate one or more profile estimation results, the one or more profile estimation results including an identification of a particular user profile from amongst a set of stored user profiles that identifies;

identifying a client system using the client-specific data; and transmitting, to the client system, profile data that identifies the particular user profile or is from the particular user profile;

receiving, from a user device, a request communication corresponding to a request for a tag code;

generating the tag code, the tag code including the client-specific data that is unique relative to client-specific data associated with other tag code generated for one or more other clients, and the tag code being configured to be integrated with one or more codes for one or more app pages or for one or more webpages and to, upon execution:
  monitor to detect occurrence of any of the set of predefined events, each predefined event of the set of predefined events including an app-page or webpage interaction; and
  upon detecting an event corresponding to a predefined event of the set of predefined events:
    identify, for each key-value pair of a set of key-value pairs, a value for the key-value pair; and
    transmit an event communication that includes the set of key-value pairs and the client-specific data;

storing the client-specific data in association with an identifier of the user device; and transmitting the tag code to the user device.

14. The system for processing tag-based event communications using machine learning as recited in claim 13, wherein the machine learning model includes:
  a Hidden Markov machine-learning model;
  a sliding window machine-learning model;
  a Maximum Entropy machine-learning model;
  an Input-Output Hidden Markov Model machine-learning model;
  a Conditional Random Fields machine-learning model;
  a Graph Transformer Network machine-learning model;
  a model using Kullback-Leibler divergence metrics to process sequential data; or
  a model using a Kalman filter to process sequential data.

15. The system for processing tag-based event communications using machine learning as recited in claim 13, wherein each event of the multiple interaction events represents an interaction with a page associated with the client system, the page including a webpage on a domain associated with the client system or an app page of an app associated with the client system, the interaction including:
  landing on the page;
  leaving the page;
  viewing a particular portion of the page;
  providing input using one or more input-accepting fields of the page;
  positioning a cursor on a particular part of the page; or
  interacting with a content object presented on the page.

16. The system for processing tag-based event communications using machine learning as recited in claim 13, wherein receiving the one or more event communications includes:
  receiving, from the user device and at a first time, a first event communication of the one or more event communications that includes a first set of key-value pairs of the one or more sets of key-value pairs, the first set of key-value pairs including at least one first value that represents a first interaction event; and
  receiving, from the user device and at a second time, a second event communication of the one or more event communications that includes a second set of key-value pairs of the one or more sets of key-value pairs, the first set of key-value pairs including at least one second value that represents a second interaction event, the second time being after the first time, and the ordered sequence of the multiple interaction events indicating that the second interaction event occurred after the first interaction event.

17. The system for processing tag-based event communications using machine learning as recited in claim 13, wherein:
  the one or more profile estimation results further includes a confidence metric; and
  the actions further include:
    determining that the confidence metric exceeds a predefined threshold, wherein the profile data is transmitted to the client system in response to determining that the confidence metric exceeds a predefined threshold.

* * * * *